United States Patent
Vitomir

(10) Patent No.: US 10,584,073 B2
(45) Date of Patent: Mar. 10, 2020

(54) GYPSUM REMOVER

(71) Applicant: Protocol Environmental Solutions Inc., Coquitlam (CA)

(72) Inventor: Sergio Vitomir, Westminster (CA)

(73) Assignee: Protocol Environmental Solutions Inc., Coquitlam, BC (CA)

( * ) Notice: Subject to any disclaimer, the term of this patent is extended or adjusted under 35 U.S.C. 154(b) by 487 days.

(21) Appl. No.: 14/422,665

(22) PCT Filed: Aug. 29, 2013

(86) PCT No.: PCT/CA2013/000474
§ 371 (c)(1),
(2) Date: Feb. 19, 2015

(87) PCT Pub. No.: WO2014/032167
PCT Pub. Date: Mar. 6, 2014

(65) Prior Publication Data
US 2015/0197454 A1    Jul. 16, 2015

Related U.S. Application Data

(60) Provisional application No. 61/694,472, filed on Aug. 29, 2012.

(51) Int. Cl.
| | | |
|---|---|---|
| C04B 41/53 | (2006.01) | |
| C04B 41/46 | (2006.01) | |
| C04B 41/00 | (2006.01) | |
| C04B 41/72 | (2006.01) | |
| C11D 7/26 | (2006.01) | |
| C11D 11/00 | (2006.01) | |

(52) U.S. Cl.
CPC ............ *C04B 41/46* (2013.01); *C04B 41/009* (2013.01); *C04B 41/5315* (2013.01); *C04B 41/72* (2013.01); *C11D 7/268* (2013.01); *C11D 11/0052* (2013.01)

(58) Field of Classification Search
CPC ............................ C11D 7/268; C04B 41/5315
USPC ............................................................ 216/83
See application file for complete search history.

(56) References Cited

U.S. PATENT DOCUMENTS

| | | |
|---|---|---|
| 3,639,279 A | 2/1972 | Gardner et al. |
| 3,688,829 A | 9/1972 | Jones |
| 3,793,209 A | 2/1974 | Thompson |
| 4,108,246 A | 8/1978 | Jones |
| 5,422,141 A * | 6/1995 | Hoopes ................. C04B 41/009 106/14.05 |
| 5,451,335 A | 9/1995 | Hieatt et al. |
| 5,468,303 A | 11/1995 | Thomas, Sr. |
| 5,891,225 A * | 4/1999 | Mishra ................... C09K 3/185 106/13 |
| 5,932,019 A | 8/1999 | Espinoza et al. |
| 6,761,774 B2 | 7/2004 | Ellis et al. |
| 9,028,610 B2 * | 5/2015 | Pardal ....................... C04B 7/02 106/602 |
| 2005/0202989 A1* | 9/2005 | Wilson ................ C11D 11/0041 510/245 |
| 2006/0040843 A1* | 2/2006 | Kinnaird ................ C11D 3/044 510/407 |

FOREIGN PATENT DOCUMENTS

| | | |
|---|---|---|
| CA | 1254820 | 5/1989 |
| CA | 2300614 A1 | 9/2000 |
| CA | 2352396 A1 | 1/2002 |
| JP | 2003002763 A | 1/2003 |
| WO | 87/04143 | 7/1987 |

* cited by examiner

*Primary Examiner* — Thomas T Pham
(74) *Attorney, Agent, or Firm* — Umberg Zipser LLP

(57) ABSTRACT

Contemplated compositions and methods for treating in service concrete includes the step of contacting a portion of the in service concrete with an composition, wherein the composition comprises a base and at least one of an acid and a salt of an acid in an amount effective to convert insoluble calcium salts into soluble calcium gluconates that can be washed away with water or other liquid.

5 Claims, No Drawings

GYPSUM REMOVER

This application claims priority to our U.S. Provisional Application Ser. No. 61/694,472, filed on Aug. 29, 2012.

FIELD OF THE INVENTION

The field of the invention is removal of gypsum from a cementitious surface, especially from in-service concrete.

BACKGROUND

Concrete used in various industries for architectural structures, foundations, walls, pavements, bridges, highways, parking structures, reservoirs, dams, pipes, footings, fences, poles, boats and other structures is often exposed to vapor, mist or liquid sulfuric acid and $H_2S$. The use of specialized industrial (film forming) coatings is the most common method for protecting concrete against the destructive action of sulfuric acid. Other methods for protection include the application of certain silicates, such as potassium silicate (dry gunning).

Unfortunately, coating failure occurs rather frequently in the relevant industries, which can lead to very rapidly progressing damage to the concrete. The life expectancy of specialized acid resistant coatings such as epoxies, vinyl esters, and polyurethanes has proven to be substantially less than adequate, which necessitates removal of the failed coatings and re-application of new coatings. However, unless salts, and especially sulfate salts, are removed from the surface and sub-surface areas of the concrete, new coatings will tend to fail, and damage to the concrete will continue to develop. In most cases, the surface of the concrete is treated by at least one of water blasting and treatment with one or more complexing agents. However, water blasting or treatment with most of the currently known complexing agents will not provide sufficient salt removal, and re-coating is often once more required after a very short time.

Others have previously put forth effort in scale removal or prevention technologies. For example, U.S. Pat. No. 3,688,829 to Jones describes a process for removing scale from an oil well using an aqueous solution of gluconates and hydroxides of alkali metals at a weight ratio between 2:1 and 5:1 at a concentration of the combination between 10 to 30% by weight. However such known compositions and processes were used in a different field and contemplate only solutions having low ratios of gluconate to KOH, which operate only at relatively low concentrations of the gluconate/KOH mix.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Further examples of known efforts can be found in U.S. Pat. No. 3,793,209 to Thompson, which describes an emulsion composition comprising ethylenediaminetetraacetic acid salt, sodium citrate or potassium glycolate as a calcium sulfate scale solvent; U.S. Pat. No. 5,932,019 to Espinoza et al., which describes a method for minimizing calcium sulfate dehydrate on a tool by contacting the tool with a solution comprising a non-calcium phosphate, water and a pH modifier (e.g., citric acid); U.S. Pat. No. 6,761,774 to Ellis et al., which describes a composition and method for in situ removal of scale using a composition comprising an alkali metal hydroxide basic agent and a chelating agent having at least two carboxylic acid functional groups (e.g., citric acid); International Patent Application Publication Number WO 87/04143 to Abadi, which describes a scale removal composition comprising an aliphatic alpha-hydroxy carboxylic acid, a gum or polymer soluble in water at a pH of 3 or less, water, and optional sodium silicate; and U.S. Pat. No. 3,639,279 to Gardner et al., which describes a scale removal composition that comprises a salt of diglycolic acid, an alkali metal hydroxide and optionally gluconic acid or a salt thereof.

Unfortunately, the aforementioned known compositions are insufficient to effectively remove acid calcium salts such as gypsum from the surface of concrete, and especially from below the surface.

Therefore, even though some methods and compositions are known in the art to help remove scale from cementitious materials, all or almost all of them suffer from one or more disadvantages. Thus, there is still a need to provide improved compositions and methods, especially when re-coating of concrete in service is performed, in addition to or as alternative to traditional media or water blasting to allow for effective removal of salts and particularly sulfate salts.

SUMMARY OF THE INVENTION

The present inventive subject matter is directed to compositions and methods of sulfate salt removal that is effective not only on the immediate surface of materials, but also in a sub-surface area of the material. Contemplated compositions and methods are particularly effective in the treatment of sulfuric acid affected concrete and other cementitious substrates (e.g., "in service" concrete).

Where desirable, especially for concrete exposed to sulfuric acid attack, the material can be further protected by applying a secondary treatment composition (e.g., a primer, sealer or acid resistant coating) thereto. In especially preferred aspects of the inventive subject matter, sulfate salt removal using compositions and methods described herein can result in a surface and sub-surface comprising a higher porosity, which allows an increase in penetration and binding of the secondary treatment composition to the material. Thus, and viewed from another perspective, removal of such salts from concrete and other materials ensures greater penetration of the secondary treatment composition(s), and as a result, the bond that is created by secondary treatment compositions applied to the concrete is stronger and substantially or completely without interference from other chemical reactions and physical degradation of the concrete interface with the coating.

In one aspect of the inventive subject matter, the inventors contemplate a method of treating a sulfuric acid affected in service concrete that includes a step of contacting a surface of the concrete with an composition. The composition will preferably include a base and at least one of gluconic acid and a salt of gluconic acid, and the step of contacting the surface will be performed for a time sufficient to convert insoluble calcium salts in the concrete into soluble calcium gluconate, and neutralize residual acidity in the concrete. Moreover, it is contemplated that the step of contacting a surface of the concrete with the composition can be for a time sufficient to allow the conversion and neutralization to apply to insoluble salts and acidity in a sub-surface of the concrete to a depth of at least 1 mm, more preferably at least 2 mm, and most preferably at least 3 mm below the surface of the concrete mass, the depth being measured as the vertical distance downward from each portion of the surface along its length.

In particularly preferred aspects, the composition applied to the in service concrete will comprise the at least one of gluconic acid and the salt of gluconic acid and the base in a total amount of the composition of at least 30 wt %, more preferably at least 40 wt %, and in a ratio of at least 5:1 (at least one of gluconic acid and salt of gluconic acid:base), more preferably at least 7:1, and most preferably at least 10:1, respectively.

While not limiting to the inventive subject matter, it is further contemplated that the method can include an additional step of rinsing the surface to thereby remove the soluble calcium gluconate from the surface of the concrete, which can be followed by an optional step of coating the surface with one or more secondary treatment compositions (e.g., primer or a protective composition).

In a further aspect of the inventive subject matter, the inventor contemplates an composition for treating a sulfuric acid affected in service concrete including an aqueous formulation comprising a base and at least one of gluconic acid and a salt of gluconic acid. Especially preferred compositions could include the at least one of gluconic acid and salt of gluconic acid, and the base, in a ratio of at least 5:1. Alternatively or additionally, preferred compositions could include the combination of the base and at least one of gluconic acid and a salt of gluconic acid in a total amount of at least 30 wt % of the composition. In addition, the combination could advantageously be present in an amount effective to convert otherwise insoluble calcium salts into soluble calcium salts to a depth of at least 3 mm below the surface, and neutralize residual acidity in the concrete to a depth of at least 3 mm.

In most preferred compositions, the at least one of gluconic acid and the salt of gluconic acid and the base will be present in a ratio of at least 7:1, more preferably in a ratio of at least 10:1. Alternatively or additionally, the combination of the base and the at least one of gluconic acid and salt of gluconic acid will be present in the composition in a total amount of at least 30 wt %, more preferably at least 40 wt %. For example, an exemplary composition comprises at least one of gluconic acid and salt of gluconic acid, and a base, present in a ratio of at least 5:1, respectively, and in a total amount of at least 30 wt %.

Contemplated compositions can be provided as a solid, liquid, or in any suitable state having any suitable viscosity. Thus, and viewed from another perspective, the composition can further include a thickening agent and be formulated as a gel.

In yet another aspect of the inventive subject matter, the inventor contemplates a method of treating a sub-surface area of a sulfuric acid affected in service concrete structure. The method includes the step of contacting the sub-surface area with a composition that is formulated to convert insoluble calcium salts into soluble calcium gluconate to a depth of at least 3 mm, and neutralize residual acidity in the concrete to a depth of at least 3 mm. Typically, the composition comprises a base and at least one of gluconic acid and a salt of gluconic acid present in a ratio of at least 1:7. Additionally or alternatively, the at least one of gluconic acid and a salt of gluconic acid and the base are present in the composition in a total amount of at least 40 wt %. In some embodiments, the composition includes a thickening agent that increases the viscosity thereof without substantially modifying its ability to react with in service concrete or other materials.

Various objects, features, aspects and advantages of the present invention will become more apparent from the following detailed description of preferred embodiments of the invention.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventor has now discovered that compositions can be prepared that are able to react, destabilize, and convert insoluble calcium salts (e.g., gypsum) on the surface and below the surface (e.g., sub-surface at least below 1 mm, at least 3 mm, at least 5 mm, or even 10 mm or more) of various materials, especially cementitious materials, into a soluble and easy rinsable residue. At the same time, any residual acidity is advantageously neutralized and removed. Thus, the resulting material after the treatment (and pressure washing where desirable) is substantially free of sulfates (e.g., gypsum) on the surface and below the surface, with significantly higher porosity, which in turn allows a dramatic increase in penetration of primers, sealers, or other secondary treatment composition. Moreover, preferred compositions contemplated herein can provide for no interference with bond formation between the secondary composition (e.g., a sealer or sealing composition) and the substrate and preserve the bond against failure. Exemplary secondary treatment compositions that can be used in conjunction with compositions of the inventive subject matter include those described in co-pending U.S. patent application Ser. No. 13/791,363.

In still further contemplated aspects of the inventive subject matter, treatment of the material could be performed on an "in service" concrete or other cementitious structure that typically already has undergone at least some exposure to or attack by sulfuric acid. The term "in-service" in the context of concrete and other cementitious materials means that the concrete or other material is part of a structure that has commenced operation for its intended purpose (e.g., holding tank in operation, or wall of a building or other structure that operated in its intended use).

Most typically, in-service concrete or other cementitious material has been exposed to sulfuric acid for a period sufficient to adversely affect (micro) structural integrity. The degree of deterioration can depend on the type of cementitious material, and can be evidenced by various characteristics. Viewed from another perspective, sulfuric acid affected concrete can be characterized by significant reduction (i.e., at least 10%) of calcium hydroxide in the cement or CSH phase as compared to unaffected concrete. Furthermore, sulfuric acid affected concrete may also be characterized by at least one of the following: at least partial exposure of aggregate; weight loss (typically at least 5 wt %); or loss of compressive strength (typically at least 5%, more typically at least 10%). In most cases, sulfuric acid affected concrete will exhibit macroscopic pitting or crumbling.

In especially preferred aspects of the inventive subject matter, compositions contemplated herein can be formulated as a cling type material to be applied in any suitable manner (e.g., spraying, brushing, rolling), preferably with a garden sprayer, to horizontal, vertical, and overhead in service concrete surfaces. While not limiting to the inventive subject matter, it is generally preferred that the composition will be in contact with the in service concrete or other material for several hours, typically at least two hours, more typically at least four hours, and most typically at least six hours, to allow the composition to react with not only the surface of the concrete, but also a sub-surface portion of the concrete.

Among other reactions that can occur during this time is a conversion of insoluble salts to soluble salts that can readily be washed away from the cementitious material. In some preferred embodiments where the composition comprises a gluconic acid or gluconate, it is contemplated that calcium salts (e.g., gypsum) in the concrete can be converted to soluble calcium gluconates. While not wishing to be bound by any particular theory, this reaction can be achieved when the acid, preferably gluconic acid, reacts with the gypsum of other insoluble calcium salt in the presence of an activator, preferably an alkali hydroxide (e.g., LiOH, NaOH, KOH, RbOH, CsOH), which can destabilize the gluconic acid or calcium salt bonds. Simultaneously or sequentially, the activator base can advantageously neutralize residual acidity in the surface and sub-surface of the concrete.

Thus, and viewed from another perspective, especially preferred compositions will include gluconate anions (or other anions having −1 charge), alkali metal cations and water. In yet another aspect of the inventive subject matter, the inventor contemplates that the activated gluconate anion has the affinity and preferentially chelates free calcium ions (e.g., $Ca^{2+}$). When gypsum is present, the chelation reaction will occur, resulting in calcium gluconate and a soluble sulfate. The remaining $SO_4^{2-}$ is used to form a soluble salt with alkali metal cations (e.g., $Li^+$, $Na^+$, $K^+$, $Rb^+$). The calcium gluconate is released from the concrete to the surface, typically as a white efflorescent powder that is easily removed by pressure washing. Other calcium salts will react in a similar fashion and will produce an easy to rinse surface deposited residue. Once a desired level of salt removal is achieved, the composition can be removed using any suitable method. For example, the composition can be removed using a pressure washer for a sufficient time to neutralize the composition such that no foamy residue is observed.

While many of the examples provided herein are directed towards compositions having alkali hydroxide activators and gluconic acid or gluconates, one should appreciate that compositions of the inventive subject matter can comprise any suitable acid, acid salts and activator bases. Thus, and viewed from another perspective, a composition of the inventive subject matter can comprise any combination of suitable base activators and acids or acid salts that can dissolve insoluble calcium salt present in cementitious material and form a chelate with $Ca^{2+}$ in the cementitious material. Where the composition is prepared as a gel or otherwise thickened material, a thickener can further be included. While the PHOSITA is well aware of various suitable thickeners, especially preferred thickening agents include water soluble agents. Thus, suitable thickening agents include hydroxy methyl, -ethyl, or -propyl cellulose at 0.1-3.0% by weight.

Furthermore, some preferred compositions can advantageously be environmentally safe, fully biodegradable, volatile organic compound (VOC) free, non-damaging to cementitious materials, and user friendly.

It is generally preferred that the at least one acid or salt thereof comprises gluconic acid, which is a sugar acid having a carboxyl group and a hydrophilic residue. Gluconic acid and gluconates contain gluconate anions that can advantageously chelate with $Ca^{2+}$ and other cations (e.g., beryllium, magnesium, strontium, barium, radium), especially in the presence of a base activator. One should appreciate that a gluconic acid or gluconate can assist in breaking the calcium sulfate salt bonds of gypsum or other insoluble salt without deteriorating the cementitious materials from which the insoluble salt is removed. Thus, and viewed from another perspective, it is generally preferred that the composition, especially when applied to delicate surfaces, will not include substantial amounts of hydrochloric acid or other similar acid, which can etch or otherwise be damaging to certain types of surfaces.

Among the various suitable acids are both monocarboxylic acids (e.g., gluconic acid) and polycarboxylic acids (e.g., dicarboxylic, tricarboxylic, tetracarboxylic). These can include, among others, aldonic acids (e.g., glyceric acid, xylonic acid, ascorbic acid), ulosonic acids (e.g., neuraminic acid, ketodeoxyoctulosonic acid), uronic acids (e.g., flucuronic acid, falacturonic acid, iduronic acid), or aldaric acids (e.g., tartaric acid, muric acid, saccharic acid). Additionally or alternatively, some contemplated compositions can comprise one or more salts of any suitable acid. Among other suitable salts, a preferred salt includes a sodium salt of an acid, and more preferably a sodium salt of gluconic acid (i.e., sodium gluconate), which include gluconate anions that readily chelate with $Ca^{2+}$ cations.

In a further aspect of the inventive subject matter, the inventor contemplates that any suitable activator can be included in the composition, preferably at a concentration of between 1-5 wt %. Among other contemplated bases, alkali hydroxides (e.g., KOH, NaOH, LiOH) are most preferred for their ability to activate gluconate anions from the gluconic acid or salt such that, in the presence of an insoluble calcium salt (e.g., in the cementitious material), a chelation reaction will occur between gluconate anions and $Ca^{2+}$ cation of the insoluble calcium salt. Furthermore, alkali hydroxides are generally preferred because alkali metals will readily form soluble salts with the remaining sulfate anions.

Thus, and viewed from another perspective, some preferred composition will comprise gluconic acid, sodium gluconate, and potassium hydroxide in certain ratios and concentrations. The potassium hydroxide will activate the gluconic acid and sodium gluconate, to form gluconate anions (and water), such that when the composition is applied to in service concrete, the gluconate anions will chelate with calcium cations of calcium sulfate in the in service concrete. Furthermore, the sulfate anion from the calcium sulfate will react with the potassium from the potassium hydroxide to form soluble potassium sulfate.

One should appreciate that the exact composition of the formulation may vary considerably depending on factors such as the desired pH of the composition. In especially preferred embodiments, the chelating agents (e.g., gluconic acid, sodium gluconate) and base activator(s) will be present in the composition in a ratio of at least 5:1, at least 7:1, at least 8:1, at least 10:1, at least 12:1, at least 15:1 or event at least 20:1 or more (chelating agent(s) to base(s)) such that the final composition has a pH of less than 7, more preferably less than 5, and most preferably between 2-3. One should also appreciate that the amount of a chelating agent or base required can depend at least in part on the respective pHs of the individual components, as well as the desired pH of the final composition (e.g., less than 7, less than 5, less than 4). For example, gluconic acid could have an acidic pH of approximately 1.8, sodium hydroxide could have a basic pH of approximately 13, and potassium hydroxide could have a basic pH of approximately 13.5. Thus, the amount of potassium hydroxide needed to obtain a composition having a pH of 4 would typically be less than the amount of sodium hydroxide needed to achieve the same pH, all else being equal. Additional acids can be added, preferably those that do not deteriorate concrete or other cementitious materials, including for example, organic carboxylic acids such as formic acid, acetic acid or benzoic acid.

Furthermore, in preferred aspects, the chelating agent(s) and base activator(s) could be present in the composition in a total amount of at least 30 wt %, at least 40 wt %, at least 50 wt %, at least 60 wt %, or even at least 65 wt % or more. It is contemplated that compositions having higher concentrations of one or more of the aforementioned elements (e.g., base activator) may be better able to penetrate a greater depth of a sub-surface or increase a porosity of a material by a greater amount. Moreover, and contrary to the findings in the '829 Patent, the inventor has now found that concentrated, high ratio (typically gluconic acid or gluconic acid salt:base) formulations are particularly suitable in removing calcium sulfate from concrete and other cementitious materials. Notably, with high concentration, high ratio formulations, one can achieve the formation of a water soluble precipitate that can readily be removed from the concrete.

Thus, and viewed from another perspective, particularly preferred compositions will comprise at least one of gluconic acid and gluconates 10 to 40% by weight, and more preferably from 25 to 40% by weight in the final composition. Moreover, such compositions will also include a caustic base activator that is preferably present from 1 to 5% by weight in the final composition. Where desired, a (e.g., cellulosic) thickener may be present from 0.1 to 3% by weight in the final composition to so form a thickened formulation or gel. While not limiting to the inventive subject matter, it is further preferred that a thickener is inert (e.g., non-reactive with in service concrete, resistant to hydroxide anions, and non-reactive with acids). Preferred compositions could have a viscosity high enough to cling to a horizontal, vertical or overhead surface, but low enough to readily penetrate cementitious material to a depth of at least 1 mm, at least, 3 mm, at least 5 mm, at least 7 mm, or even 10 mm or more. In other preferred aspects, the balance of the formulation is water (optionally in admixture with one or more water soluble co-solvents).

Viewed from yet another perspective, particularly preferred compositions will comprise at least one of gluconic acid and gluconates 10 to 40% (w/w), and more preferably from 25 to 40% (w/w) in the final composition. Moreover, such compositions will also include a caustic activator that is preferably present from 1 to 5% (w/w) in the final composition. Where desired, a (e.g., cellulosic) thickener may be present from 0.1 to 3% (w/w) in the final composition to so form a thickened formulation or gel. Moreover, a corrosion inhibitor such as polyphosphates, silicates or borates can be included in the composition to protect the cementitious material.

Thus, specific embodiments and applications of methods of gypsum removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The invention claimed is:

1. A method of treating concrete to remove water insoluble calcium sulfate salts from the concrete, comprising:
    contacting a surface of the concrete with a composition, wherein the concrete includes the water insoluble calcium sulfate salts;
    wherein the composition comprises an alkali hydroxide base and at least one of gluconic acid and a salt of gluconic acid at a weight ratio of the least one of gluconic acid and a salt of gluconic acid to the alkali hydroxide base of at least 5:1;
    wherein the step of contacting is performed for a time sufficient to (a) convert the water insoluble calcium sulfate salts into water soluble calcium gluconate to a depth of at least 3 mm, and (b) neutralize residual acidity in the concrete to a depth of at least 3 mm; and
    wherein (a) the at least one of gluconic acid and the salt of gluconic acid and (b) the alkali hydroxide base are present in a total amount of at least 60 wt % of the composition.

2. The method of claim 1 wherein the weight ratio of the at least one of gluconic acid and the salt of gluconic acid to the alkali hydroxide base is at least 7:1.

3. The method of claim 1 wherein the weight ratio of the at least one of gluconic acid and the salt of gluconic acid to the alkali hydroxide base is at least 10:1.

4. The method of claim 1 further comprising a step of rinsing the surface to thereby remove the water soluble calcium gluconate.

5. The method of claim 1 or claim 4 further comprising a step of coating the surface with a protecting composition or a primer.

* * * * *